(12) United States Patent
Kautz et al.

(10) Patent No.: US 10,526,970 B2
(45) Date of Patent: Jan. 7, 2020

(54) COMBINED HEAT AND POWER PLANT AND METHOD FOR OPERATION THEREOF

(71) Applicant: SIEMENS AKTIENGESELLSCHAFT, München (DE)

(72) Inventors: Martin Kautz, Erlangen (DE); Michael Metzger, Markt Schwaben (DE); Jochen Schäfer, Nuremberg (DE); Philipp Wolfrum, Munich (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 739 days.

(21) Appl. No.: 14/373,857

(22) PCT Filed: Dec. 12, 2012

(86) PCT No.: PCT/EP2012/075147
§ 371 (c)(1),
(2) Date: Jul. 22, 2014

(87) PCT Pub. No.: WO2013/110396
PCT Pub. Date: Aug. 1, 2013

(65) Prior Publication Data
US 2015/0033758 A1    Feb. 5, 2015

(30) Foreign Application Priority Data

Jan. 23, 2012 (DE) .................. 10 2012 200 889

(51) Int. Cl.
*F02C 6/18* (2006.01)
*F24D 10/00* (2006.01)
(Continued)

(52) U.S. Cl.
CPC ................ *F02C 6/18* (2013.01); *F01K 13/02* (2013.01); *F01K 23/065* (2013.01);
(Continued)

(58) Field of Classification Search
CPC ... F02C 6/18; F02C 6/14; Y02E 20/14; F24H 9/20; F24H 2240/02; F24D 5/02;
(Continued)

(56) References Cited

U.S. PATENT DOCUMENTS

| 3,890,787 A | * | 6/1975 | Margen | ................... F01K 9/003 236/49.1 |
| 3,996,749 A | * | 12/1976 | Denis | ........................ F01K 3/00 60/652 |

(Continued)

FOREIGN PATENT DOCUMENTS

| CN | 1207451 A | 2/1999 | ............. F01K 23/10 |
| CN | 1403764 A | 3/2003 | ................ F02C 6/14 |

(Continued)

OTHER PUBLICATIONS

International Search Report for PCT/EP2012/075147 dated Mar. 22, 2013.
(Continued)

*Primary Examiner* — Gerald L Sung
*Assistant Examiner* — Alain Chau
(74) *Attorney, Agent, or Firm* — Slayden Grubert Beard PLLC

(57) ABSTRACT

The present disclosure relates to combined heat and power plants. The teachings thereof may be embodied in methods for operating such a plant to provide electrical and thermal energy to a consumer unit, comprising: simultaneously generating electrical energy and heat in a process flow based on a demand for electricity; storing heat generated in excess of a demand for heat; and increasing a heat output when a
(Continued)

difference between an actual provided heat output and the demand for heat is exceeded.

6 Claims, 1 Drawing Sheet

(51) Int. Cl.
    *F01K 23/06* (2006.01)
    *F24H 9/20* (2006.01)
    *H02J 3/38* (2006.01)
    *F01K 13/02* (2006.01)

(52) U.S. Cl.
    CPC ............ *F24D 10/003* (2013.01); *F24H 9/20* (2013.01); *H02J 3/381* (2013.01); *F24D 2220/06* (2013.01); *F24H 2240/00* (2013.01); *F24H 2240/02* (2013.01); *Y02B 30/17* (2018.05); *Y02E 20/14* (2013.01); *Y02P 80/15* (2015.11)

(58) Field of Classification Search
    CPC ...... F24D 10/00; F24D 10/003; F24D 10/006; F24D 11/001; F24D 11/002; F24D 2200/16; F24D 2200/06; Y02P 80/15; F01K 13/02; F01K 23/065; F01K 17/02; F01K 17/025; H02J 3/381; Y02B 30/17
    See application file for complete search history.

(56) References Cited

U.S. PATENT DOCUMENTS

| | | | | |
|---|---|---|---|---|
| 4,065,055 A * | 12/1977 | De Cosimo | ............... | F24D 3/08 237/12.1 |
| 4,410,028 A * | 10/1983 | Alefeld | ................... | F24D 11/02 165/104.12 |
| 4,715,192 A * | 12/1987 | Katz | ........................ | F02G 5/02 237/12.1 |
| 5,607,013 A | 3/1997 | Inoue et al. | | |
| 5,730,356 A * | 3/1998 | Mongan | .............. | F24D 19/0092 237/19 |
| 5,751,604 A * | 5/1998 | Yamauchi | ................. | F02G 5/00 700/288 |
| 6,038,851 A | 3/2000 | Shiba | ........................ | 60/39.182 |
| 6,347,520 B1 * | 2/2002 | Ranasinghe | .......... | F01K 25/065 60/39.182 |
| 6,487,508 B1 * | 11/2002 | Suzuki | .................... | H02J 3/008 702/61 |
| 6,584,793 B2 | 7/2003 | Fukushima et al. | ......... | 62/238.3 |
| 6,585,036 B2 * | 7/2003 | Amerman | ............... | E21B 23/00 165/45 |
| 6,640,580 B1 * | 11/2003 | Strasser | ................ | F24D 11/001 62/437 |
| 6,757,591 B2 * | 6/2004 | Kramer | .................... | H02J 3/00 700/288 |
| 6,938,417 B2 | 9/2005 | Watanabe et al. | .............. | 60/597 |
| 6,966,185 B2 * | 11/2005 | Shimada | .................. | F02G 5/04 290/2 |
| 7,040,544 B2 * | 5/2006 | Guyer | ........................ | F24D 5/02 237/12.1 |
| 7,055,328 B2 * | 6/2006 | Huengerle | ............ | F01K 17/025 60/660 |
| 7,127,896 B2 * | 10/2006 | Shimada | .................. | F02G 5/04 60/698 |
| 7,284,709 B2 * | 10/2007 | Guyer | ........................ | F24D 5/02 237/12.1 |
| 8,286,423 B2 * | 10/2012 | Yuri | ........................ | F02G 5/00 237/12.1 |
| 2001/0018971 A1 * | 9/2001 | Tabuchi | ................ | F24F 5/0017 165/236 |
| 2002/0082747 A1 * | 6/2002 | Kramer | ..................... | H02J 3/00 700/276 |
| 2002/0104643 A1 * | 8/2002 | Amerman | ............... | E21B 23/00 165/45 |
| 2003/0029169 A1 * | 2/2003 | Hanna | ..................... | F01K 17/02 60/651 |
| 2004/0020206 A1 * | 2/2004 | Sullivan | ................ | F01C 1/0215 60/670 |
| 2005/0115241 A1 * | 6/2005 | Shimada | .................. | F02G 5/04 60/698 |
| 2005/0161521 A1 | 7/2005 | Guyer | | |
| 2006/0207262 A1 * | 9/2006 | Firey | ......................... | F02C 3/26 60/784 |
| 2009/0020281 A1 * | 1/2009 | Ueda | ..................... | F24D 11/005 165/287 |
| 2009/0107129 A1 | 4/2009 | Yuri et al. | | |
| 2009/0205335 A1 * | 8/2009 | Wohlleib | .................. | F01K 3/10 60/641.2 |
| 2009/0320503 A1 | 12/2009 | Kamiya | | |
| 2011/0087475 A1 | 4/2011 | Noureldin | | |
| 2011/0187126 A1 * | 8/2011 | Nakamura | ............... | F03G 7/04 290/1 R |
| 2012/0279681 A1 * | 11/2012 | Vaughan | ............... | F24D 10/003 165/62 |

FOREIGN PATENT DOCUMENTS

| | | | |
|---|---|---|---|
| CN | 1494648 A | 5/2004 | ................ F02C 6/18 |
| DE | 19602330 C1 | 6/1997 | |
| DE | 10339564 A1 | 3/2004 | |
| DE | 102012200889.6 | 1/2012 | |

OTHER PUBLICATIONS

German OA for Application No. 102012200889.6 dated Sep. 4, 2012.
K. Schmitz, et al.; "Combined Heat and Power"; 3rd Ed., Springer, 2005, pp. 53-60.
Office Action dated Oct. 19, 2015 in corresponding Canadian Patent Application No. 2,862,079.

\* cited by examiner

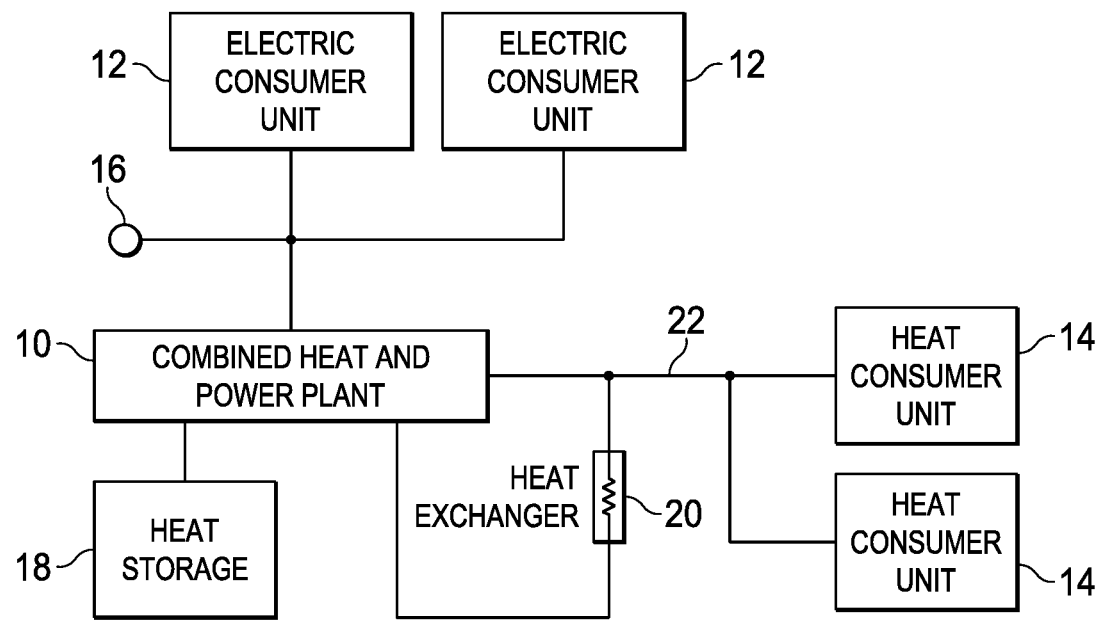

COMBINED HEAT AND POWER PLANT AND METHOD FOR OPERATION THEREOF

CROSS REFERENCE TO RELATED APPLICATIONS

This application is the U.S. national stage of International Application No. PCT/EP2012/075147, filed Dec. 12, 2012 and claims the benefit thereof. The International Application claims the benefit of German Application No. 102012200889.6 filed on Jan. 23, 2012, both applications are incorporated by reference herein in their entirety.

BACKGROUND

Described below are a method for operating a combined heat and power plant and a combined heat and power plant.

Combined heat and power plants, which simultaneously provide electrical energy and heat, are becoming increasingly important for supplying energy, firstly because they typically are very efficient and hence have low consumption and emission values, and secondly because they can be used to compensate fluctuations in the feed-in of renewables.

Combined heat and power plants are usually operated either in a heat-operated or power-operated mode, depending on which demand determines the regulation of the combined heat and power plant. It is known here, in cases where there is a greater demand for electricity than for heat, to temporarily store the excess heat generated in corresponding stores so that the heat and the electricity can be utilized asynchronously. However, the typical sizes of store here enable the combined heat and power plant to operate without a thermal load for only a few hours. If, when a store is full, there is still no thermal load, then such a combined heat and power plant must, as necessary and despite the continuing demand for electricity, adjust its operating mode because of insufficient cooling. When a combined heat and power plant is used in conjunction with electricity networks with a high degree of photovoltaic generation or use of wind power, it can now be the case that particularly high electrical loads are required by the combined heat and power plant without the heat which is generated at the same time being removed. Because of the limited size of the stores, after just a few hours of rain or a few hours of no wind, failure of the combined heat and power plant may therefore occur, so that stand-by power must additionally be maintained which can be used in this eventuality.

However, this is not advisable from either an operational or economic perspective.

SUMMARY

A method for operating a combined heat and power plant and a combined heat and power plant are described below which enable combined heat and power plants to operate particularly flexibly even when the demand for the thermal energy generated is low.

In such a method for operating a combined heat and power plant for providing electrical and thermal energy for at least one consumer unit, it is provided that the heat output requested is increased when a threshold value for a difference between provided and requested heat output is exceeded.

In other words, according to the method, an additional artificial demand for heat is created for the case where the demand for electricity significantly exceeds the current demand for heat. As a result, the load on heat stores which may be used can be relieved so that the electrical energy requested can be reliably provided even for relatively long periods of time without the heat storage capacity of the combined heat and power plant being fully utilized.

Even when there is a high demand for electricity at the same time as a low requested heat output, the electricity can thus be reliably provided without there being any need for additional stand-by capacity to be activated.

The method thus enables the power plant to operate particularly economically, in particular in an electrical network with a high number of stochastically fluctuating generators.

To increase the heat output requested, it is possible to simply dissipate a proportion of the heat output provided, i.e. to discharge it into the environment. For this purpose, a heat exchanger can, for example, be provided which is coupled to the surrounding air and/or to the soil and/or to a water reservoir. The dissipated energy is thus wasted, i.e. is not reclaimed as in the case of a heat store. Specific implementations of this are, for example, a dry or wet recooling, the discharge of heat to stationary or running water or to an opened cooling water circuit, the heated cooling water being disposed of.

It is moreover possible to increase the amount of heat requested by increasing the heat consumption of the at least one consumer unit. To do this, for example, a set heating temperature for a room, a swimming pool or the like can, be increased, or also the lowering of the nighttime temperature of a heating system can be suspended. The heat consumption is thus increased here via an energy management system, wherein the increase expediently is selected such that a comfort threshold for users is not exceeded despite the rooms, swimming pool, or the like being heated more intensely.

Furthermore, a further consumer unit can be activated in order to increase the heat consumption. Processes with a high thermal energy requirement, for example heating procedures, cleaning procedures, or the like can therefore, for example, be conducted ahead of schedule, or alternatively rooms which are not per se needed immediately can be heated additionally in order thus to remove the excess heat.

Described below is a combined heat and power plant for providing electrical and thermal energy for at least one consumer unit which includes a first heat exchanger by which heat can be transferred from a heat source of the combined heat and power plant to a heat distribution network. It is moreover provided that at least one further heat exchanger is thermally coupled to the combined heat and power plant, by which heat can be discharged to the environment when a threshold for a difference between a provided and a requested heat output is exceeded.

As already described with reference to the method, when there is a high demand for electrical energy and simultaneously a low demand for heat energy, in this way excess generated heat can be dissipated to the environment so that the generation of electrical energy can be continued without the combined heat and power plant overheating owing to the excessively low heat removal. For this purpose, as already described, it is advantageous to couple the further heat exchanger to the surrounding air and/or to the soil and/or to a water reservoir in order to allow even large quantities of heat to be reliably removed.

BRIEF DESCRIPTION OF THE DRAWINGS

These and other aspects and advantages will become more apparent and more readily appreciated from the following description of the exemplary embodiments, explained in detail below with reference to the drawing.

The single FIGURE shows a schematic representation of an exemplary embodiment of a combined heat and power plant.

DETAILED DESCRIPTION OF THE PREFERRED EMBODIMENT

Reference will now be made in detail to the preferred embodiments, examples of which are illustrated in the accompanying drawings, wherein like reference numerals refer to like elements throughout.

A combined heat and power plant 10 simultaneously makes available electrical energy for electrical consumer units 12 and thermal energy for thermal consumer units 14 and therefore has a particularly high degree of efficiency. However, problems can also arise from the fact that the electrical and thermal output of the combined heat and power plant 10 cannot be adjusted independently of each other. For example, if a high electrical output is requested from the combined heat and power plant 10 by the electrical consumer units 12 or via a connected power network 16, whilst the thermal consumer units 14 require no or only a very low output, then problems can occur with the removal of the quantity of heat generated by the combined heat and power plant 10.

Some of the excess heat thus generated can be stored temporarily in stores 18 but if these are overloaded, the combined heat and power plant 10 must be switched off to prevent overheating. In particular when the combined heat and power plant 10 is integrated into a power network 16 with a high number of stochastic generators such as, for example, solar energy or wind power plants, there is however an urgent need for load balancing in the power network 16. In the case of a combined heat and power plant 10, additional back-up capacity would then have to be brought onstream, which is not economically advisable.

In order to avoid this, a heat exchanger 20 is coupled to the heat distribution network 22 of the combined heat and power plant 10. If the demand for electricity significantly exceeds the demand for heat, then excess generated heat can be dissipated via the heat exchanger 20. The heat exchanger 20 can thus be coupled, for example, to the surrounding air, to stationary or running water, and to the soil. Opening the cooling water circuit of the combined heat and power plant 10 so that cold fresh water is heated and then disposed of can also contribute to the removal of excess heat.

The requested quantity of heat can be further managed by controlling the thermal consumer unit 14. In the event of demand for electricity significantly exceeding the demand for heat, here too additional cooling of the combined heat and power plant 10 can be achieved. A building management system can, for example, slightly increase the room temperature of rooms which are heated by the thermal consumer units 14 in order to ensure additional heat removal. Any heated swimming pools or the like can also be additionally heated up in order to contribute to the removal of heat.

If the excess heat is generated at night, a nighttime lowered temperature program of the room heating system can be suspended so that the rooms are again heated more intensely and additional heat is also thus removed. Such an energy management system is also possible outside residential premises, for example in commercial operations. Procedures with a high demand for thermal energy, such as heating processes, cleaning processes or the like can, for example, be conducted ahead of schedule so that the excess heat generated is removed.

As a whole, it is thus possible to prevent the combined heat and power plant 10 from having to be shut down because of overheating, which avoids the need to make available additional back-up capacities in the power network 16 and thus enables economic operation of mixed, small-scale and flexible power networks with a high number of stochastically operating generators.

A description has been provided with particular reference to preferred embodiments thereof and examples, but it will be understood that variations and modifications can be effected within the spirit and scope of the claims which may include the phrase "at least one of A, B and C" as an alternative expression that means one or more of A, B and C may be used, contrary to the holding in *Superguide* v. *DIRECTV*, 358 F3d 870, 69 USPQ2d 1865 (Fed. Cir. 2004).

The invention claimed is:

1. A method for operating a combined heat and power plant for providing electrical and thermal energy for a plurality of consumer units comprising electrical consumer units and thermal consumer units, wherein each consumer unit of the plurality of the consumer units has a respective demand for heat from the combined heat and power plant, the method comprising:

simultaneously generating electrical energy and thermal energy in a process flow at the combined heat and power plant wherein an amount of electrical energy generated mutually depends on an amount of thermal energy generated, wherein the amount of electrical energy generated cannot be adjusted independently of the amount of thermal energy generated;

generating the amount of electrical energy in response to a demand for electrical energy by the electrical consumer units and supplying the amount of electrical energy to the electrical consumer units in response to the demand for electrical energy;

supplying thermal energy generated mutually with the amount of electrical energy to a first set of the thermal consumer units of the plurality of consumer units in response to a respective demand for heat by the first set of the thermal consumer units;

storing a quantity of the thermal energy that is generated in excess of the respective demand for heat by the first set of the thermal consumer units in one or more stores for thermal energy;

determining that a difference between a total of the respective demand for heat from the first set of the thermal consumer units and an amount of heat generated corresponding to the amount of thermal energy generated mutually with the amount of electrical energy exceeds a predetermined threshold, and as a result of the difference exceeding the predetermined threshold, supplying additional generated thermal energy to at least some of the first set of thermal consumer units or an additional thermal consumer unit of the plurality of consumer units, each having a respective demand for heat from the combined heat and power plant, wherein the additional generated thermal energy supplied exceeds the respective demand for heat by the at least some of the first set of the thermal consumer units or the additional thermal consumer unit; and further dissipating a portion of the additional generated thermal energy as waste using a heat exchanger coupled to at least one of soil and a water reservoir.

2. The method as claimed in claim 1, wherein dissipating the portion of the additional generated thermal energy is further effected by transferring the portion of the additional generated thermal energy to surrounding air.

3. The method as claimed in claim 1, wherein supplying additional generated thermal energy to at least some of the first set of the thermal consumer units or an additional thermal consumer unit further comprises increasing a heat consumption of at least one of the first set of the thermal consumer units.

4. The method as claimed in claim 3, wherein increasing the heat consumption of at least one of the first set of the thermal consumer units comprises increasing a set heating temperature for a room or a swimming pool to increase heat consumption.

5. The method as claimed in claim 4, wherein supplying additional generated thermal energy to at least some of the first set of the thermal consumer units or an additional thermal consumer unit comprises suspending a lowering of a nighttime temperature of a heating system to increase heat consumption.

6. The method as claimed in claim 5, wherein supplying additional generated thermal energy to at least some of the first set of the thermal consumer units or an additional thermal consumer unit comprises activating a further consumer unit to increase heat consumption.

\* \* \* \* \*